… … …

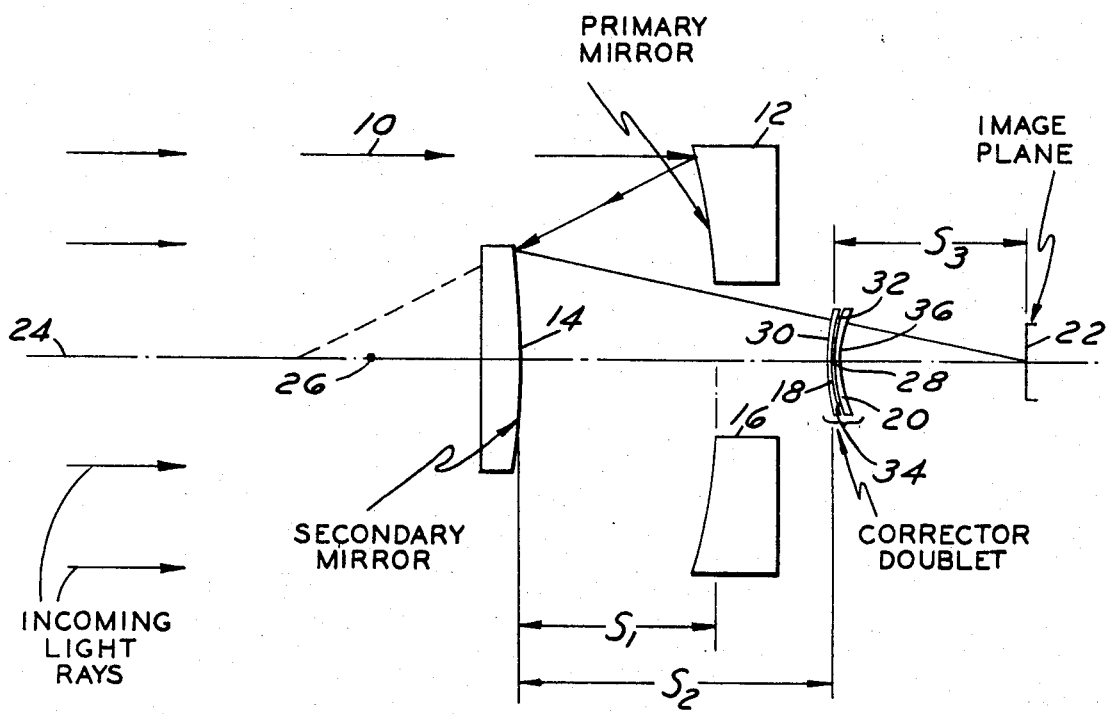

United States Patent Office 3,524,698
Patented Aug. 18, 1970

3,524,698
ANASTIGMATIC WIDE-FIELD
CASSEGRAIN SYSTEM
Harry P. Brueggemann, South Pasadena, Calif., assignor to Tridea Electronics, South Pasadena, Calif., a corporation of Missouri
Filed Dec. 8, 1967, Ser. No. 689,071
Int. Cl. G02b 17/08
U.S. Cl. 350—200     18 Claims

ABSTRACT OF THE DISCLOSURE

This invention relates to a Cassegrain mirror system and more particularly to a wide-field angle Cassegrain system having a substantially improved power of resolution. In this invention two conic mirrors having equal or nearly equal radii of curvature are positioned on a common axis so that they share a common geometrical reference point to correct for the third order aberrations of astigmatism, field curvature and spherical aberration. A corrector doublet is positioned on the common axis at a geometrical reference point of the second mirror to correct or compensate for the coma of the mirror without introducing any other third order aberrations into the combined system of mirrors and lenses.

BACKGROUND OF THE INVENTION

This invention relates to a Cassegrain mirror system and more particularly to a wide-field angle Cassegrain system having a substantially improved power of resolution. In general, the images formed by all systems of mirrors and lenses have slight defects or imperfections known as aberrations. In the monochromatic third order theory of geometrical optics, there are considered to be five specific types of aberrations or deviations of the ray from the path prescribed by the classical formulae of ray tracing. These five deviations or aberrations are termed spherical aberration, coma, astigmatism, field curvature and distortion.

The power of resolution or resolving power of an optical system is a measure of the system's ability to produce specific images of objects which are very close together. The deviations or aberrations of the image produced by an optical system adversely affect the resolving power of the system. In a Cassegrain system of mirrors the resolving power of the system near the edge of the field is particularly adversely effected by the third order aberration known as astigmatism. It has been determined that the effect of astigmatism at the edge of the field is approximately proportional to the square of the field angle. The term "field" is used to define the area that can be seen or viewed through a particular optical system and the term "field angle" refers to the angular measurement of the width of the field.

In this description the term "reference point" means one of the two geometrical points of a conic such as an ellipse or a hyperbola which is known to geometricians as a "focus" of the conic. In optical literature and technology the term "focus" refers to the point where light rays converge. This double meaning has been allowed to persist in optical literature because in a true Cassegrain mirror system the "reference point" and the "focus" are identical points. However, in this invention the two points are not coincident and the term "reference point" will always be used to refer to the geometricians' foci or points from which a conic is generated.

In brief, the present invention provides a wide-field angle Cassegrain mirror system with substantially improved resolving power by the use of two conic mirrors having equal radii of curvature positioned on a common axis so that they share a common geometrical reference point to correct for the third order aberrations of astigmatism, spherical aberration and field curvature. A system of lenses known as a corrector is positioned at a geometrical reference point of one of the conic mirrors to correct for the aberrations known as coma without introducing any other aberrations, except distortion, in the image formed by the combined system of mirrors and lenses. This results in an image which is corrected for all third order aberrations except distortion. The correction of all third order aberrations except distortion and particularly the elimination of astigmatism provides a Cassegrain system with substantially improved resolving power.

Two prior art references known to the inventor are the S. Rosin Pat. No. 3,274,886 and an article entitled "Cassegrain-Type Telescopes" by Ronald R. Willey, Jr. appearing at page 191 of the April 1962, publication of Sky & Telescope. These references disclose various Cassegrain mirror and lens arrangements for correcting some of the third order aberrations. However, neither of these references anticipate or disclose the substantial improvement that can be made in the resolving power of a wide-field angle Cassegrain mirror system by positioning a corrector doublet at a reference point of the secondary mirror.

DESCRIPTION OF THE INVENTION

This invention relates to a Cassegrain mirror system and more particularly to an improved wide-field angle Cassegrain system which is free from astigmatism and corrected for all other third order aberrations except distortion.

A primary object of this invention is to provide a wide-field angle Cassegrain system which has a substantially improved power of resolution. This object is achieved by the structure of this invention which makes corrections for the third order aberrations known as astigmatism, spherical aberration, field curvature and coma.

Other objects and features of this invention will be apparent from the following description and claims in which there is found the manner of making and using the invention and the best mode contemplated by the inventor for carrying out the invention.

A drawing accompanies this disclosure showing the physical relationship of the mirrors and corrector lenses of this invention to each other.

Referring to the drawing:

In FIG. 1 there is shown an incoming light ray 10 striking a primary conic mirror 12, and a secondary conic mirror 14, passing through a hole 16 in the primary mirror 12, passing through a corrector doublet composed of two lenses 18 and 20, and striking an image plane 22. The diameter of the secondary mirror 14 is smaller than the diameter of the primary mirror 12. The conic mirrors 12, 14 can be either elliptic, parabolic, hyperbolic or a combination thereof. For example, both mirrors could be hyperbolic or the primary mirror 12 could be hyperbolic and the secondary mirror 14 parabolic. In this invention the arrangement of the conic mirrors 12, 14 corrects the third order aberrations of astigmatism, spherical aberration and field curvature. The lenses 18, 20 correct the system of mirrors for the third order aberration of coma without introducing any other aberrations into the combined system of mirrors and lenses.

Astigmatism is a third order aberration that occurs only when the incoming ray under consideration is not parallel to the optical axis of the system. Astigmatism is the off-axis condition in which the optical system has a different focus in each of two orthogonal planes. The result being that two mutually perpendicular line images are formed, one in each orthogonal plane, rather than a single point image. Field curvature is the deviation of an image surface from a plane and spherical aberration is the deviation caused by the failure of all incoming rays parallel to the optical axis of a spherical mirror to be focused at a common point on the optical axis of the spherical mirror.

If the conic mirrors 12, 14 are positioned so that they share both a common axis and a common reference point, the system of mirrors will be inherently free of third order astigmatism. The term "inherently free of astigmatism" means that there is no astigmatism at every field angle, while the term "corrected for astigmatism" means that only certain field angles are free of astigmatism. If the radii of curvature measured at the apex of the conic mirrors 12, 14 are equal, the system of mirrors will be corrected for third order field curvature. If the mirrors 12, 14 share a common geometrical axis 24, a common geometrical reference point 26, and have equal radii of curvature and are designed in accordance with the equation:

$$-7e_1-19e_1^2-5e_1^3-e_1^4+e_2(9+31e_1+5e_1^2-11e_1^3-2e_1^4) \quad (A)$$
$$-e_2^2(1-e_1)^2(e_1^2+9e_1+6)+e_2^3(1-e_1)^3=0$$

in which $e_1$ is the eccentricity of the primary mirror 12 and $e_2$ is the eccentricity of the secondary mirror 14, the system of mirrors 12, 14 will be inherently free of third order astigmatism and corrected for third order field curvature and spherical aberration. Since this equation is cubic in $e_2$, it can be evaluated for $e_2$ by selecting a value for $e_1$. A preferred range of values for $e_2$ is discussed below. If the two mirrors 12, 14 are located on a common geometrical axis 24 and if the radii of curvature of both mirrors are equal to each other, the mirrors will share a common reference point 26 when the distance, measured along the axis, between the apices of the mirrors 12, 14 is:

$$S_1=\frac{r_k(e_2-e_1)}{(1+e_1)(1+e_2)} \quad (B)$$

in which $S_1$ is the distance between the mirrors as shown in FIG. 1, $r_k$ is the radius of curvature measured at the apex of either mirror since they are of equal radii, $e_1$ is the eccentricity of the primary mirror 12, and $e_2$ is the eccentricity of the secondary mirror 14.

Coma is the second of the monochromatic aberrations of third order theory and it arises from a difference in the focal length between zones concentric to the optical axis of the system of mirrors. This aberration produces a comet-like appearance on the image plane of a point object which is not on the optical axis. The coma of the mirror system can be corrected without introducing any other aberrations in the combined system of mirrors and lenses by locating an essentially zero power corrector at a reference point of the secondary mirror 14. For purposes of illustration a corrector doublet comprising lenses 18 and 20 is shown in FIG. 1. However, a corrector having any number of lenses with the combination having essentially zero power will perform satisfactorily and an increased number of lenses usually improves the performance of the system of lenses and mirrors.

In designing the corrector doublet, it has been experimentally determined that better results are usually obtained if the glass of the lens 18 is of lower dispersive power than the glass of the lens 20. The mirrors have no chromatic aberrations, and to eliminate chromatic aberrations in the corrector doublet, the ratio of the dispersive powers of the lenses 18, 20 should be approximately equal to the square of the ratio of the distance of each lens 18, 20 from the image plane 22 and for the mirror lens and image plane configuration shown in FIG. 1 this ratio is expressed by the equation:

$$\frac{V_1}{V_2}=\left[\frac{r_{k1}(1-e_1)(1+e_2)^2+2\delta(1-e_2)(e_2-e_1)}{r_{k1}(1-e_1)(1+e_2)^2-2\delta(1-e_2)(e_2-e_1)}\right]^2 \quad (C)$$

in which $V_1$ is the dispersion of the first lens 18 of the doublet, $V_2$ is the dispersion of the second lens 20 of the doublet, $\delta$ is the separation or distance between the centers of the lenses 18, 20 of the doublet, $e_1$ is the eccentricity of the primary mirror 12, $e_2$ is the eccentricity of the second mirror 14, and $r_{k1}$ is the radius of curvature at the apex of the primary mirror 12 which is also equal to the radius of curvature of the secondary mirror 14. Knowing the ratio of the dispersive powers, it is possible to select specific glasses for the lenses 18, 20.

By the proper curvature of the four surfaces of the lenses 18, 20 of the doublet when it is located at a geometrical reference point 28 of the mirror 14, it is possible to correct or compensate for the coma of the system of mirrors without introducing any other third order aberrations into the combined system of mirrors and lenses, except distortion. The radii of the surfaces of the lenses of the corrector doublet of the configuration of mirrors and lenses shown in FIG. 1 are given by the following equations in which it is assumed that the conic mirrors 18, 20 share a common axis and a common geometrical reference point, that the radii measured at the apex of the mirrors 18, 20 are equal to each other, and that the corrector has zero thickness and is positioned on the common axis at a geometrical reference point of the mirror 14:

$$\frac{1}{r_1}=\frac{8(n+1)(1-e_2)(e_2-e_1)}{r_{k1}(n+2)(1-e_1)(1+e_2)^2}+\frac{n(2n+1)}{2f_1(n-1)(n+2)}$$
$$+\frac{nf_1(1-e_2)^2(e_2-e_1)[e_1(e_1-2)(1+e_2)^2+(1-e_2)^2+4e_1]}{(n+1)r_{k1}^2(1-e_1)^2(1+e_2)^4} \quad (D)$$

$$q_1=\frac{2f_1(n-1)}{r_1}-1 \quad (E)$$

$$p=-\frac{8f_1(1-e_2)(e_2-e_1)}{r_{k1}(1-e_1)(1+e_2)^2}-1 \quad (F)$$

$$q_2=\frac{4(n^2-1)p}{(n+2)}+q_1 \quad (G)$$

$$\frac{1}{r_2}=\frac{(q_1-1)}{(q_1+1)}\times\frac{1}{r_1} \quad (H)$$

$$\frac{1}{r_3}=-\frac{(q_2+1)}{(q_1+1)}\times\frac{1}{r_1} \quad (I)$$

$$\frac{1}{r_4}=-\frac{(q_2-1)}{(q_1+1)}\times\frac{1}{r_1} \quad (J)$$

in which $e_1$ is the eccentricity of the primary mirror 12, $e_2$ is the eccentricity of the secondary mirror 14, $f_1$ is the focal length of the first lens 18 of the doublet, $n$ is the average index of refraction of the two glasses selected for the lenses 18, 20 of the doublet, $r_{k1}$ is the radius of curvature measured at the apex of the primary mirror 12 which is equal to the radius of curvature of the secondary mirror 14, $r_1$ is the radius of curvature of a first surface 30 of the lens 18 of the corrector doublet, $r_2$ is the radius of curvature of the second surface 32 of lens 18 of the doublet, $r_3$ is the radius of curvature of a first surface 34 of the lens 20 of the doublet, $r_4$ is the radius of curvature of a second surface 36 of the lens 20 of the doublet, $q_1$ is the shape factor of the first lens 18 of the doublet, $q_2$ is the shape factor of the second lens 20 of the doublet, $p$ is the position factor of the doublet. Since in a real system the corrector doublet will have some thickness, the above equations provide the basic starting point of the corrector doublet design which must be modified to compensate for the actual thickness of real lenses.

In the mirror and lens configuration of FIG. 1, the corrector doublet will be located at the reference point 28 of the secondary mirror 14 if the distance between the apex of the secondary mirror 14 and the apex of the surface 30 of the lens 18 of the doublet measured along the geometrical axis 24 is equal to:

$$S_2 = \frac{r_{k1}}{(e_2-1)} \qquad (K)$$

in which $S_2$ is the distance of the corrector doublet from the secondary mirror 14 as shown in FIG. 1, $r_{k1}$ is the radius of curvature measured at the apex of the primary mirror 12 which is equal to the radius of curvature of the secondary mirror 14, and $e_2$ is the eccentricity of the secondary mirror 14.

The spacing between the corrector which is located at the reference point 28 of the secondary mirror and the flat image plane 22 measured along the geometrical axis 24 commonly known as the back focal length is determined by:

$$S_3 = \frac{r_{k1}(1-e_1)(1+e_2)^2}{4(1-e_2)(e_2-e_1)} \qquad (L)$$

in which $S_3$ is the distance between the external reference point of the secondary mirror and the image plane measured along the geometrical axis, $e_1$ is the eccentricity of the primary mirror 12, $e_2$ is the eccentricity of the secondary mirror 14 and $r_{k1}$ is the radius of curvature measured at the apex of the primary mirror 12 and is equal to the radius of curvature of the secondary mirror 14. During the initial design of the system of FIG. 1, the system aperture is considered to be at the external reference point 28 of the secondary mirror 14. Therefore, the diameter of the corrector doublet is the system aperture and is determined by:

$$D_{1d} = S_3/f_{ns} \qquad (M)$$

ir which $D_{1d}$ is the diameter of the lenses 18, 20 of the doublet, $f_{ns}$ is the $f$ number of the system and $S_3$ is the distance between the reference point 28 of the secondary mirror 14 and the image plane 22. The $f$ number of the system is determined by the particular optical speed, resolution and field of view requirements that are dictated by the specific application in which the combined system of mirrors and lenses is utilized.

After initial values of the system parameters are determined in accordance with the above equations, a sketch or scale drawing of the entire system of mirrors and lenses should be made to determine if the physical embodiment would be a practical system. If the aperture 16 in the primary mirror is so large that light can strike the image plane 22 without passing through all of the elements of the system, it will be necessary to use shields and sun shades. It has been empirically determined that the need for shields and shades decreases with decreasing values of $e_2$, but the optical part of the system gets longer as $e_2$ decreases in value. Usually the system performs better when $e_2$ is lower (less than 4) if the additional system length can be tolerated. If the initial values of the system parameters indicate that the physical embodiment of the system would be practical, they can be optimized to provide the final design values.

The above equations are the basis for a third order design of the anastigmatic cassegrain system shown in FIG. 1 in which the essential limitations are that the hyperbolic mirrors 12, 14 share a common geometrical axis 24 and have a common reference point 26, that the radius of curvature of the mirrors measured at the apex of the mirrors be equal, and that a system of zero power corrector lenses such as the doublet comprising lenses 18, 20 must be positioned at a reference point 28 of the secondary mirror. Suitable computer programs can be used to optimize this third order design and in some computer programs, such as the Code III Program of Optical Research Associates of 550 North Rosemead Blvd., Pasedena, Calif., ZIP code 91107, the design can be corrected for higher order aberrations. In using a computer program to optimize the design, it is advisable to freeze the mirror parameters of $r_{k1}$, $r_{k2}$, $e_1$, $e_2$, and $s_1$ during the first part of the program, thereby forcing the computer to optimize only the corrector doublet. If the computer is initially allowed to work with all of the parameters, it will work most heavily with the mirror parameters since these parameters have the strongest influence on the system performance. This will result in the fifth and higher order doublet aberrations being corrected by changes in the mirrors and it has been empirically determined that better performance of the system will be obtained if the doublet aberrations are corrected as much as possible within the doublet itself. After the computer has reached a pateau in optimizing the doublet parameters, the mirror parameters can be utilized to complete the optimization of the entire system. It has been empirically determined that in using the Optical Research Associates optimizing program the configuration of the system of FIG. 1 is generally improved if in the final computer design of the system, the system aperture is moved from the geometrical reference point 28 of the secondary mirror to one of the mirrors after all of the aberrations are corrected in the initial computer optimization of the above equations in which it was assumed that the system aperture was located at a reference of the secondary mirror. In a lens and mirror system that has not been corrected for all aberrations, the location of the system aperture affects the system's performance; therefore, the system aperture is first placed at the geometrical reference point 28 of the secondary mirror to assist or ease the computer in optimizing the system. After the major portions of the aberrations of the system have been corrected by the initial runs of the computer, the position of the aperture in the computer program can be changed to correspond with the position in the contemplated physical design of the system and the final computer optimizing runs can be made. Only the system aperture is moved to one of the mirrors, the corrector doublet must remain at the geometrical reference point 28. The moving of the aperture improves the blocking of the mirror system.

Computer optimized design parameters for a specific embodiment of this invention, in which the $f$ number of the system is 4.0, the effective focal length of the system is 101.12 inches, and the field of view is 3.0°, are:

| Surface | Curvature | Thickness (in.) | Glass code | Diam. | e |
|---|---|---|---|---|---|
| Object | 0 | ∞ | | 32.5543 | 1.35529716 |
| 12 | −0.01088142 | −20.688675 | | 17.2066 | 4.003912324 |
| 14 | −0.01086641 | 29.451740 | | 6.5891 | |
| 30 | 0.05506636 | 0.217280 | 446673 | 6.5714 | |
| 32 | 0.02700766 | 0.001800 | | 6.5145 | |
| 34 | 0.05856562 | 0.062000 | 498651 | 6.4465 | |
| 36 | 0.08386550 | 0.766000 | | 6.3149 | |
| Aperture | 0 | 25.255656 | | 5.3000 | |
| Image 22 | 0 | | | | |

| Glass Code | 768.2 mμ | 589.3 mμ | 486.1 mμ | |
|---|---|---|---|---|
| 446673 | 1.44188 | 1.44623 | 1.45088 | Indices |
| 498651 | 1.49316 | 1.49823 | 1.50358 | | in which "surface" refers to the various surfaces (as shown in FIG. 1) of the mirrors and lenses, "curvature" refers to the reciprocal of the on axis radius in inches of each surface, "thickness" refers to the on axis spacing in inches between a surface and the next surface listed immediately below it, "glass code" refers to the index of refraction of the glass of the lenses, "diameter" refers to the outside diameter in inches of the various surfaces, and $e$ refers to the eccentricity of the mirrors. This example is diffraction limited over the total flat field of view of 3°, for the full aperture of $f/4.0$. This example is presented to illustrate the construction of objective systems having a high power of resolution in accordance with the present invention.

What is claimed as new is as follows:
1. An optical system of lenses and mirrors which comprises, in combination:
   (a) a first mirror being generally hyperbolic and having a central hole therein,
   (b) a second mirror being generally hyperbolic with a diameter smaller than the diameter of the first mirror and a radius of curvature at the apex equal to the radius of curvature at the apex of the first mirror with the second mirror being positioned with respect to the first mirror so that the mirrors share both a common geometrical axis and a common reference point, the eccentricity of the second mirror being related to the eccentricity of the first mirror to correct for third order spherical aberration, with the mirrors being positioned on the common axis so that a ray of light can be reflected from the first mirror to the second mirror, and
   (c) an essentially zero power system of at least two lenses ground for correction of the coma of the first and second mirrors and positioned at a geometrical reference point of the secondary mirror so that rays of light from the secondary mirror will pass through the lenses,
whereby the combined system of mirrors and lenses is substantially free of third order astigmatism and corrected for field curvature, spherical aberration and coma.

2. An optical system as defined in claim 1 which has only two of said lenses comprising a corrector doublet.

3. An optical system as defined in claim 2 which comprises an image plane behind said lenses a distance measured along the common geometrical axis from the reference point at which said lenses are located substantially equal to $$\frac{r_{k1}(1-e_1)(1+e_2)^2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximately equal to the square of the ratio of the distance of each lens from the image plane.

4. An optical system as defined in claim 1 in which the eccentricity $e_1$ of the first mirror to the eccentricity $e_2$ of of the second mirror is substantially in accordance with $$-7e_1-19e_1^2-5e_1^3-e_1^4+e_2(9+31e_1+5e_1^2-11e_1^3-2e_1^4)$$
$$-e_2^2(1-e_1)^2(e_1^2+9e_1+6)+e_2^3(1-e_1)^3=0$$

5. An optical system as defined in claim 1 in which there are only first and second lenses, the four radii of curvature of which are substantially in accordance with $$\frac{1}{r_1}=\frac{8(n+1)(1-e_2)(e_2-e_1)}{r_{k1}(n+2)(1-e_1)(1+e_2)^2}+\frac{n(2n+1)}{2f_1(n-1)(n+2)}$$
$$+\frac{nf_1(1-e_2)^2(e_2-e_1)[e_1(e_1-2)(1+e_2)^2+(1-e_2)^2+4e_1[}{(n+1)r_{k1}^2(1-e_1)^2(1+e_2)^4}$$
$$q_1=\frac{2f_1(n-1)}{r_1}-1$$
$$p=-\frac{8f_1(1-e_2)(e_2-e_1)}{r_{k1}(1-e_1)(1+e_2)^2}-1$$
$$q_2=\frac{4(n^2-1)p}{(n+2)}+q_1$$
$$\frac{1}{r_2}=\frac{(q_1-1)}{(q_1+1)}\times\frac{1}{r_1}$$
$$\frac{1}{r_3}=-\frac{(q_2+1)}{(q_1+1)}\times\frac{1}{r_1}$$
$$\frac{1}{r_4}=-\frac{(q_2-1)}{(q_1+1)}\times\frac{1}{r_1}$$

in which $e_1$ is the eccentricity of the first mirror, $e_2$ is the eccentricity of the second mirror, $f_1$ is the focal length of the first lens, $n$ is the average index of refraction of the glasses of said first and second lenses, $r_{k1}$ is the radius of curvature at the apex of the first mirror, $r_1$ is the radius of curvature of the first surface of said first lens, $r_2$ is the radius of curvature of the second surface of said first lens, $r_3$ is the radius of curvature of the first surface of said second lens, $r_4$ is the radius of curvature of the second surface of said second lens, $q_1$ is the shape factor of said first lens, $q_2$ is the shape factor of said second lens, and $p$ is the position factor of said lenses.

6. An optical system as defined in claim 5 in which the eccentricity $e_1$ of the first mirror to the eccentricity $e_2$ of the second mirror is substantially in accordance with $$-7e_1-19e_1^2-5e_1^3-e_1^4+e_2(9+31e_1+5e_1^2-11e_1^3-2e_1^4)$$
$$-e_2^2(1-e_1)^2(e_1^2+9e_1+6)+e_2^3(1-e_1)^3=0$$

7. An optical system as defined in claim 6 which comprises an image plane behind said lenses a distance measured along the common geometrical axis from the reference point at which said lenses are located substantially equal to $$\frac{r_{k1}(1-e_1)(1+e_2)^2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximately equal to the square of the ratio of the distance of each lens from the image plane.

8. An optical system as defined in claim 6 in which the aperture of the system is located at one of the mirrors.

9. An optical system as defined in claim 5 which comprises an image plane behind said lenses a distance measured along the common geometrical axis from the reference point at which said lenses are located substantially equal to $$\frac{r_{k1}(1-e_1)(1+e^2)_2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximately equal to the square of the ratio of the distance of each lens from the image plane.

10. An optical system of lenses and mirrors comprising, in combination:
   (a) a first mirror being generally hyperbolic and having a central hole therein,
   (b) a second mirror being generally hyperbolic with a diameter smaller than the diameter of the first mirror and a radius of curvature measured to the apex equal to the radius of curvature at the apex of the first mirror, the eccentricity of the second mirror being related to the eccentricity of the first mirror to correct for third order spherical aberration, both the first and the second mirrors being positioned so that they share a common geometrical axis and so that a light ray striking the first mirror can be reflected to the second mirror with the distance between the apex of the first and the apex of the second mirror when measured along the common axis being substantially equal to $$\frac{r_k(e_2-e_1)}{(1+e_1)(1+e_2)}$$

in which $r_k$ is the radius of curvature at the apex of either of said mirrors, $e_1$ is the eccentricity of the first mirror, and $e_2$ is the eccentricity of the second mirror, and (c) at least two lenses with an axis coincident with the common axis and positioned so that a ray of light reflected from the second mirror will pass through the lenses with the distance between the apex of the second mirror and the apex of the first lens as measured along the common axis being substantially equal to $$\frac{r_{k1}}{(e_2-1)}$$

in which $r_{k1}$ is the radius of curvature measured at the apex of the first mirror and $e_2$ is the eccentricity of the second mirror, whereby the mirrors are inherently free of third order astigmatism and corrected for spherical aberration and field curvature and the image formed by the mirrors and the lenses is substantially free of third order astigmatism and corrected for spherical aberration, field curvature and coma.

11. An optical system as defined in claim 10 which has only two of said lenses comprising a corrector doublet.

12. An optical system as defined in claim 11 which comprises an image plane behind said lenses a distance measured along the common geometrical axis from the reference point at which said lenses are located substantially equal to $$\frac{r_{k1}(1-e_1)(1+e_2)^2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximatley equal to the square of the ratio of the distance of each lens from the image plane.

13. An optical system as defined in claim 10 in which the eccentricity $e_1$ of the first mirror to the eccentricity $e_2$ of the second mirror is substantially in accordance with $$-7e_1-19e_1{}^2-5e_1{}^3-e_1{}^4+e_2(9+31e_1+5e_1{}^2-11e_1{}^3-2e_1{}^4)\\-e_2{}^2(1-e_1)^2(e_1{}^2+9e_1+6)+e_2{}^3(1-e_1)^3=0$$

14. An optical system as defined in claim 10 in which there are only first and second lenses, the four radii of curvature of which are substantially in accordance with $$\frac{1}{r_1}=\frac{8(n+1)(1-e_2)(e_2-e_1)}{r_{k1}(n+2)(1-e_1)(1+e_2)^2}+\frac{n(2n+1)}{2f_1(n-1)n+2)}$$
$$+\frac{nf_1(1-e_2)^2(e_2-e_1)[e_1(e_1-2)(1+e_2)^2+(1-e_2)^2+4e_1]}{(n+1)r_{k1}^2(1-e_1)^2(1+e_2)^4}$$
$$q_1=\frac{2f_1(n-1)}{r_1}-1$$
$$p=-\frac{8f_1(1-e_2)(e_2-e_1)}{r_{k1}(1-e_1)(1+e_2)^2}-1$$
$$q_2=\frac{4(n^2-1)p}{(n+2)}+q_1$$
$$\frac{1}{r_2}=\frac{(q_1-1)}{(q_1+1)}\times\frac{1}{r_1}$$
$$\frac{1}{r_3}=-\frac{(q_2+1)}{(q_1+1)}\times\frac{1}{r_1}$$
$$\frac{1}{r_4}=-\frac{(q_2-1)}{(q_1+1)}\times\frac{1}{r_1}$$

in which $e_1$ is the eccentricity of the first mirror, $e_2$ is the eccentricity of the second mirror, $f_1$ is the focal length of the first lens, $n$ is the average index of refraction of the glasses of said first and second lenses, $r_{k1}$ is the radius of curvature at the apex of the first mirror, $r_1$ is the radius of curvature of the first surface of said lens, $r_2$ is the radius of curvature of the second surface of said first lens, $r_3$ is the radius of curvature of the first surface of said second lens, $r_4$ is the radius of curvature of the second surface of said second lens, $q_1$ is the shape factor of said first lens, $q_2$ is the shape factor of said second lens, and $p$ is the position factor of said lenses.

15. An optical system as defined in claim 14 in which the eccentricity $e_1$ of the first mirror to the eccentricity $e_2$ of the second mirror is substantially in accordance with $$-7e_1-19e_1{}^2-5e_1{}^3-e_1{}^4+e_2(9+31e_1+5e_1{}^2-11e_1{}^3-2e_1{}^4)\\-e_2{}^2(1-e_1)^2(e_1{}^2+9e_1+6)+e_2{}^3(1-e_1)^3=0$$

16. As optical system as defined in claim 15 which comprises an image plane behind said lenses a distance measured along the common geometrical axis from the reference point at which said lenses are located substantially equal to $$\frac{r_{k1}(1-e_1)(1+e_2)^2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximately equal to the square of the ratio of the distance of each lens from the image plane.

17. An optical system as defined in claim 15 in which the aperture of the system is located at one of the mirrors.

18. An optical system as defined in claim 14 which comprises an image plane behind said lenses a distance measured along the common geometrical axis from the reference point at which said lenses are located substantially equal to $$\frac{r_{k1}(1-e_1)(1+e_2)^2}{4(1-e_2)(e_2-e_1)}$$

in which $e_1$ is the eccentricity of the first mirror, $e_2$ is the eccentricity of the second mirror, and $r_{k1}$ is the radius of curvature measured at the apex of the first mirror, and in which the glass of the lens which is closer to the second mirror is of lower dispersive power than the glass of the second lens with the ratio of the dispersive powers of the lenses being approximately equal to the square of the ratio of the distance of each lens from the image plane.

References Cited

UNITED STATES PATENTS 3,274,886   9/1966   Rosin _____ 350—27

OTHER REFERENCES

Wynne: "Field Correctors for Parabolic Mirrors," Physical Society of London Proceedings, vol. 62B, No. 360B, December 1949, pp. 772–787.

Rosin: "Ritchey Chrétien Corrector System," Applied Optics, vol. 5, No. 4, April 1966, pp. 675, 676.

JOHN K. CORBIN, Primary Examiner

U.S. Cl. X.R.

350—212